United States Patent
Taylor et al.

(10) Patent No.: US 6,233,607 B1
(45) Date of Patent: May 15, 2001

(54) MODULAR STORAGE SERVER ARCHITECTURE WITH DYNAMIC DATA MANAGEMENT

(75) Inventors: Clement G. Taylor, Plainsboro; Danny Chin, Princeton Junction; Jesse S. Lerman, Princeton, all of NJ (US)

(73) Assignee: DIVA Systems Corp., Redwood City, CA (US)

( * ) Notice: Subject to any disclaimer, the term of this patent is extended or adjusted under 35 U.S.C. 154(b) by 0 days.

(21) Appl. No.: 09/283,895

(22) Filed: Apr. 1, 1999

(51) Int. Cl.$^7$ .................................................. G06F 15/16
(52) U.S. Cl. ......................... 709/217; 709/215; 709/219; 709/231; 711/100; 711/114; 711/158
(58) Field of Search ..................................... 709/200, 203, 709/215, 217, 219, 231; 711/100, 114, 158

(56) References Cited

U.S. PATENT DOCUMENTS

| | | | |
|---|---|---|---|
| 5,148,432 | * | 9/1992 | Gordon et al. ........................ 371/10.1 |
| 5,473,362 | * | 12/1995 | Fitzgerald et al. ........................ 348/7 |
| 5,671,377 | * | 9/1997 | Bleidt et al. ........................... 395/328 |
| 5,892,913 | * | 4/1999 | Adiga et al. ........................... 709/219 |
| 5,933,603 | * | 8/1999 | Vahalia et al. ................... 395/200.55 |
| 5,935,206 | * | 8/1999 | Dixon et al. ........................... 709/219 |
| 5,951,694 | * | 9/1999 | Choquier et al. ........................ 714/15 |
| 6,006,264 | * | 12/1999 | Colby et al. ............................ 709/226 |
| 6,028,725 | * | 2/2000 | Blumenau ................................. 360/8 |
| 6,047,309 | * | 4/2000 | Dan et al. .............................. 709/201 |
| 6,047,323 | * | 4/2000 | Krause ................................... 709/227 |
| 6,061,504 | * | 5/2000 | Tzelnic et al. ................... 395/200.49 |
| 6,092,178 | * | 7/2000 | Jindal et al. ............................. 712/27 |
| 6,112,239 | * | 8/2000 | Kenner et al. ......................... 709/224 |

* cited by examiner

*Primary Examiner*—Saleh Najjar
(74) *Attorney, Agent, or Firm*—Thomason, Moser & Patterson, LLP

(57) ABSTRACT

A method of data management for efficiently storing and retrieving data in response to user access requests. The architecture comprises a plurality of disk drives over which data is distributed, and a plurality of processors, each of which is assigned to a subset of the disk drives in a modular fashion. The server architecture employs dynamic data management methods and load-balancing methods to assign user requests to processors. The modular server architecture, in combination with the dynamic data management and load balancing methods, provides both good performance (i.e., low expected-case access times and high disk bandwidth), and fault-tolerance. The architecture is particularly well suited to video-on-demand systems in which a video server stores a library of movies and users submit requests to view particular programs.

18 Claims, 7 Drawing Sheets

US 6,233,607 B1

MODULAR STORAGE SERVER ARCHITECTURE WITH DYNAMIC DATA MANAGEMENT

The present invention generally relates to a modular storage server architecture for retrieving data in response to user access requests. In particular, the invention relates to a server architecture in which data is dynamically distributed over a plurality of disks, a plurality of processors are assigned to particular disks, and data access requests are assigned to particular processors in order to provide good data access performance and server fault tolerance.

BACKGROUND OF THE DISCLOSURE

A storage server allows users to efficiently retrieve information from large volumes of data stored on a plurality of disks and secondary storage (e.g., magnetic tape or an optical-disk jukebox). For example, a video server is a storage server that accepts user requests to view a particular movie from a video library, retrieves the requested program from disk, and delivers the program to the appropriate user(s). Such a video server is disclosed in U.S. Pat. No. 5,671,377, entitled "System For Supplying Streams Of Data To Multiple Users By Distributing A Data Stream To Multiple Processors And Enabling Each User To Manipulate Supplied Data Stream" issued to Bleidt et al. on Sep. 23, 1997.

The foregoing storage server employs one or more processors that access data that is stored across an array of disk drives using fault tolerant storage technique such as RAID (Redundant Array of Inexpensive Disks). While such architectures provide uniform non-blocking access to all of the data stored on the disk drives, they do not facilitate a modular architecture. Since data is striped across all of the disk drives in the array, adding or removing disk drives to/from the server requires that all of the data be re-striped across the new set of disk drives. Because the servers are not modular, it is therefore inconvenient to increase or decrease storage capacity by adding or removing disk drives.

There is therefore a need in the art for a storage server architecture that is modular and can acceptably resolve content blocking issues.

SUMMARY OF THE INVENTION

The disadvantages associated with the prior art are overcome by the present invention of a server comprising a plurality of modules, each of which contains a single processor and a cluster of, for example, 16 disk drives, and a host controller that communicates with and assigns data requests to each of the modules. Data is written to the disk drives by striping the data across the 16-disk drive cluster of a single module according to a RAID-5 protocol, with parity and spares distributed amongst the disk drives in the cluster.

The architecture of the present invention employs dynamic data management methods, which determine whether data should reside on disk or secondary storage, on which disk drives data should be stored, and how data should be replicated and/or migrated to new disk drives based on observed user access patterns. These methods also migrate popular data to faster disk tracks to reduce average access time and thus improve performance.

User access requests are assigned to modules based on the data stored at each module, and each module's current load (the number of requests waiting to be serviced). If the requested data is not on a disk drive, the data is retrieved from secondary storage, and may be stored on the disk drives for rapid subsequent access. When a requested data item on the disk drive is replicated, load balancing is performed by assigning the request to the module holding the data with the lowest load. In addition, user access requests waiting to retrieve replicated data may be dynamically and seamlessly migrated to another module based on changes in module loads.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
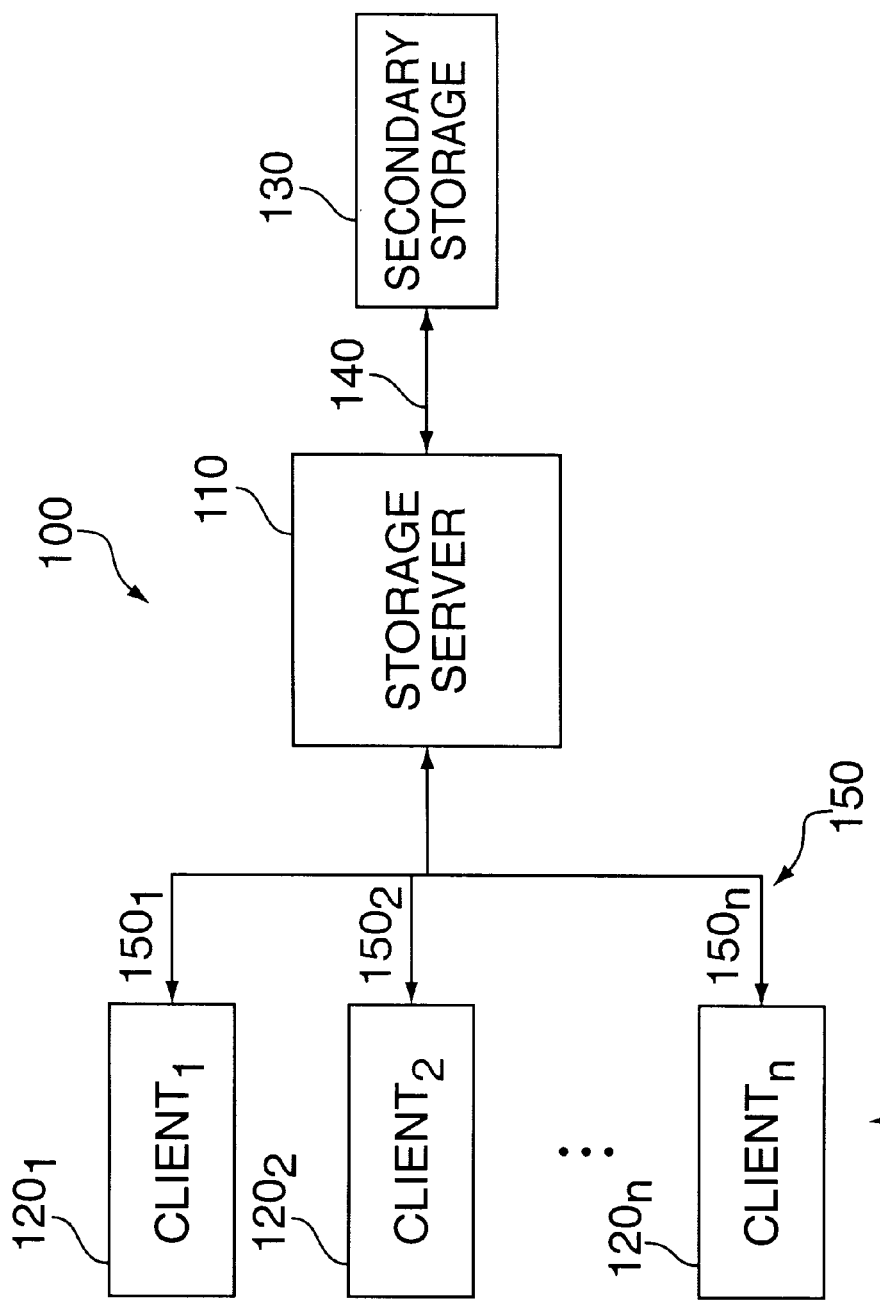
FIG. 1 depicts a high-level block diagram of a data retrieval system that includes a storage server incorporating the present invention.

FIG. 1 depicts a client/server data retrieval system 100 that employs a storage server 110 to accept user data access requests from clients $120_1$, $120_2$, $120_3$, ... $120_n$ (collectively referred to as clients 120) via bi-directional data paths $150_1$, $150_2$, ... $150_n$ (collectively referred to as paths 150). Server 110 retrieves the requested data from the disk drives within the server, and, when necessary, from secondary storage 130 via bi-directional path 140, and outputs the requested data for distribution to the appropriate client(s) along data path(s) 150. A detailed description of a video-on-demand system that finds the server of the present invention particularly useful is described in commonly assigned U.S. patent application Ser. No. 08/984,710, filed Dec. 3, 1997 which is hereby incorporated herein by reference.

Figure 2:
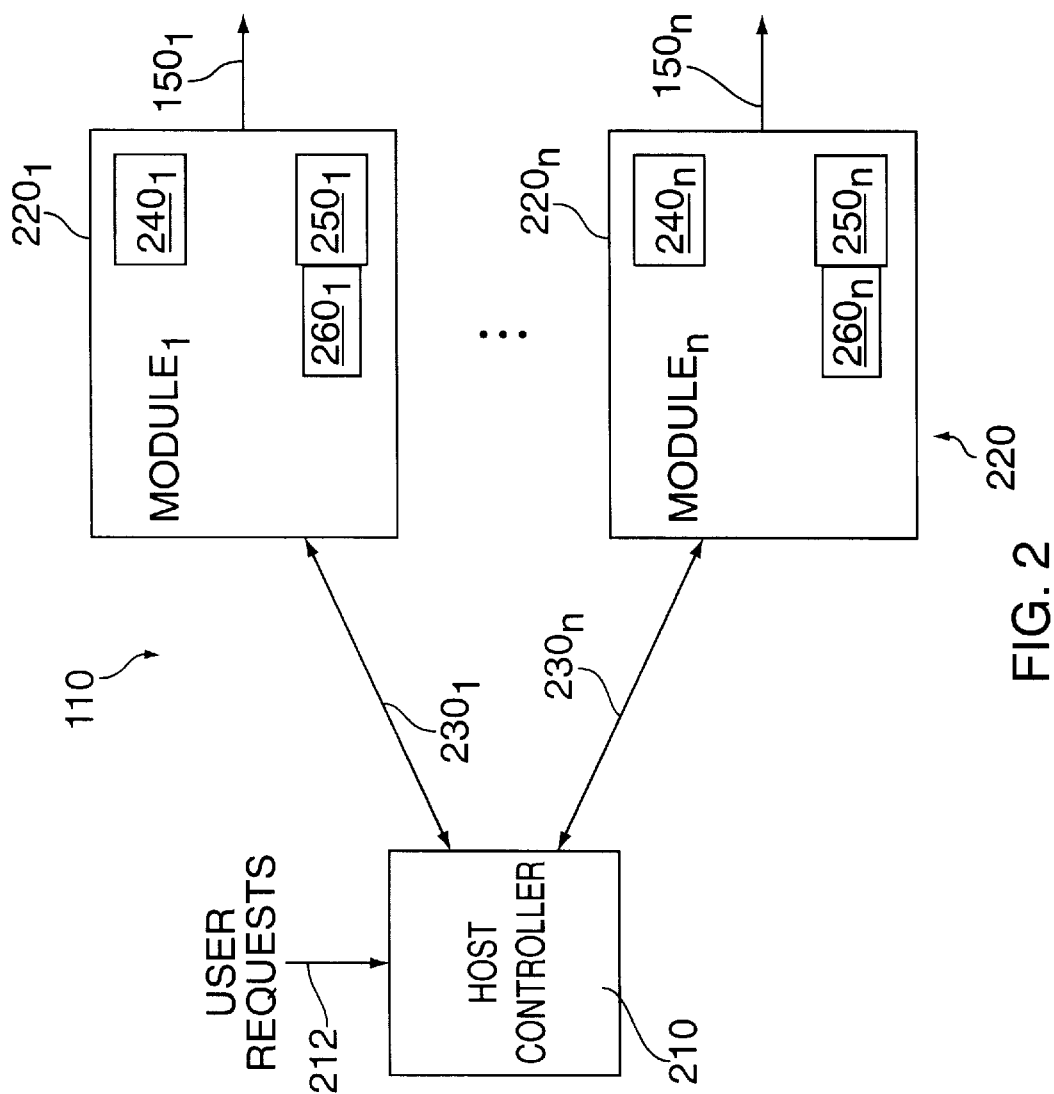
FIG. 2 depicts a detailed diagram of the architecture of the storage server.

FIG. 2 depicts a detailed diagram of the architecture of storage server 110. The storage server comprises a host controller 210 and a plurality of modules $220_1$, $220_2$ ... $220_n$ (collectively referred to as modules 220) that are coupled to the host controller by bi-directional data paths $230_1$, $230_2$, ... $230_n$ (collectively referred to as paths 230). In the preferred embodiment of the invention, data paths 230 are part of an ethernet network. Each of the modules 220 comprise a processor 240, a cluster of 16 disk drives 250, and a request queue 260 in which access requests wait to be serviced by the disk drives 250. The host controller 210 accepts incoming user access requests from data path 212, and assigns these requests to modules 220 by forwarding the requests along data paths 230.

A given data item (e.g., a video program) is stored on disk by striping the data across the 16 disk drives of one of the modules 220 according to the RAID 5 protocol. RAID 5 is well known in the art as a protocol that provides fault-tolerant error-correcting storage and retrieval on an array of disks.

A data item is therefore stored at a single module on a 16-disk drive cluster, in contrast to non-modular server architectures in which data is striped across the entire set of disk drives. In order to manage data in this modular architecture, protocols are necessary for determining which module shall store the data at any given time. In addition, it is possible in a modular architecture to store multiple copies of data within various modules, a technique known as data replication, and to dynamically migrate data from one module to another to accommodate changes in user access patterns. Finally, a substantial data library is stored in secondary storage 130, e.g., content server, a magneto-optical storage array or other form of data storage, and selected data items are recalled from secondary storage 130 stored on disk 250 at one or more modules 220 to enable rapid access of the data. As such, special data management routines are necessary to facilitate data movement from secondary storage 130 to the storage modules 220.

The Data Initialization Protocol determines which data items are retrieved from the secondary storage 130 and stored on the disk drives 250, and at which the module(s) 220 data are stored. The basic strategy of the Data Initialization Protocol is to repeatedly retrieve the most popular data items from the secondary storage 130 and store them on the disk drives 250, until there is insufficient disk space available to hold any additional data items. At each iteration of the Data Initialization Protocol, the candidate modules 220 that have sufficient disk space to hold the data are identified, and the data is stored at the candidate module with the lowest load, where "load" refers to the total bandwidth requirement for the requests waiting in the module's queue 260. Since at initialization, no user requests have yet been submitted, each data item is assigned an initial popularity value, and the load is estimated as the sum of the popularity values of the data items already stored on the module disk drive cluster 250. By selecting the module 220 with the lowest load, the Data Initialization Protocol provides a significant load-balancing effect that keeps the popular data items evenly distributed over all the modules 220, thus enhancing the performance of the server 110.

Figure 3:
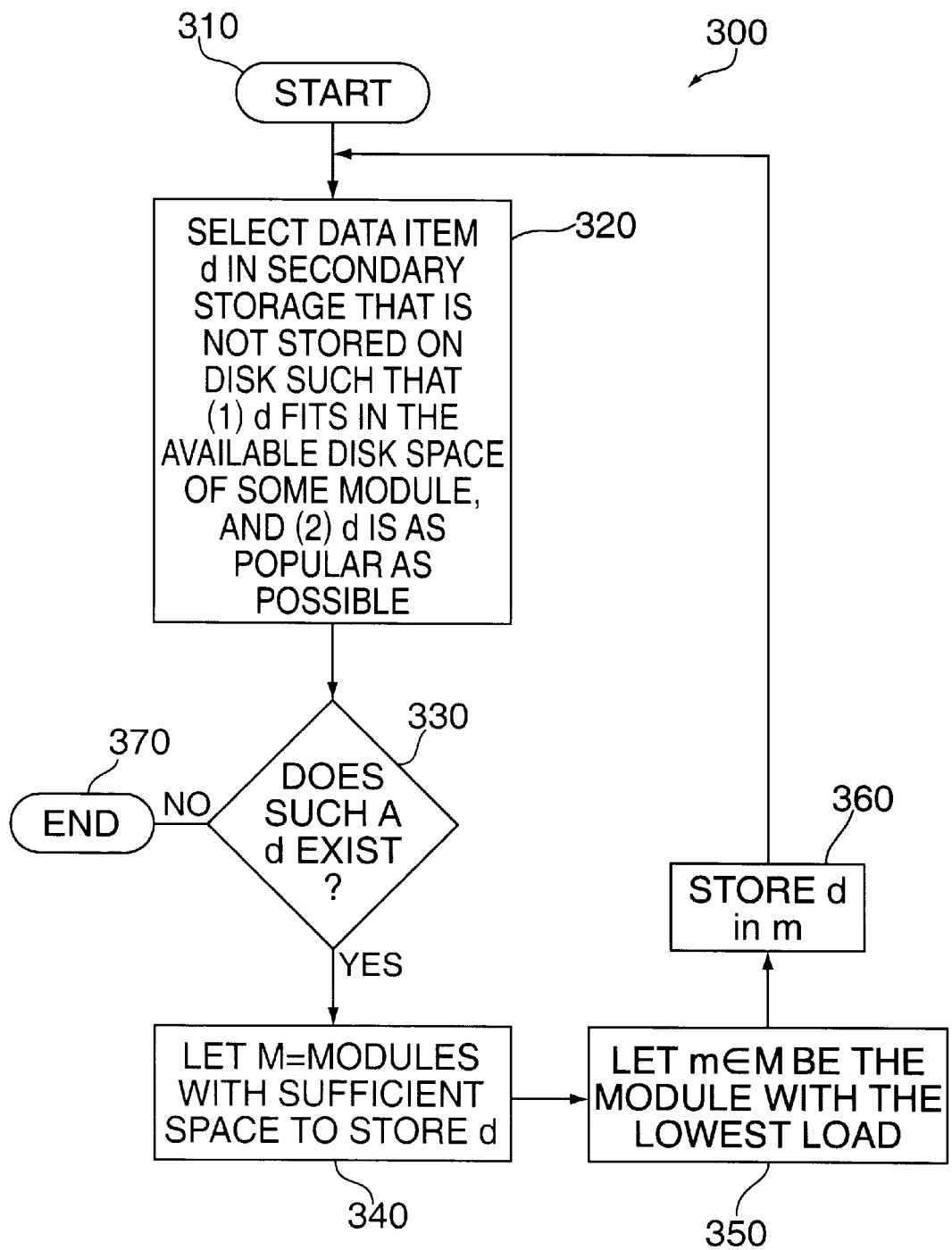
FIG. 3 depicts a flowchart specification of the Data Initialization Protocol.

FIG. 3 depicts a flow diagram of the Data Initialization Protocol 300. At each iteration of the protocol, the most popular data item in secondary storage that can fit in at least one module's 16-disk drive cluster is selected at step 320. If no such data item exists, as determined by the query at step 330, the protocol terminates at step 370; otherwise, the set of candidate modules (M) with sufficient disk space is determined at step 340. At step 350, the module (M) having the lowest present load is selected from the set of modules M having sufficient space to store data d. At step 360, the data item is then stored on the disk drive cluster of the candidate module with the lowest load and the next iteration begins at step 320.

Note that the above specification of the Data Initialization Protocol does not have any provisions for multiple copies of data items stored on the disk drives (i.e., data replication.) In some applications such as a video server; however, it is desirable to replicate frequently requested data so that these data items don't act as "bottlenecks" when a substantial number of users request the same data item concurrently. Thus, the preferred embodiment of the invention employs a more general version of the Data Initialization Protocol in which data can be stored on the disk drive clusters of multiple modules simultaneously. In this more general version of the protocol, the popularity value of a data item is an integer denoting the desired degree of replication for that data item (i.e., how many copies of the data item should be stored.) Note that multiple copies of a data item should never be stored within the same module, as this offers no performance advantage while unnecessarily consuming additional disk space.

Figure 4:
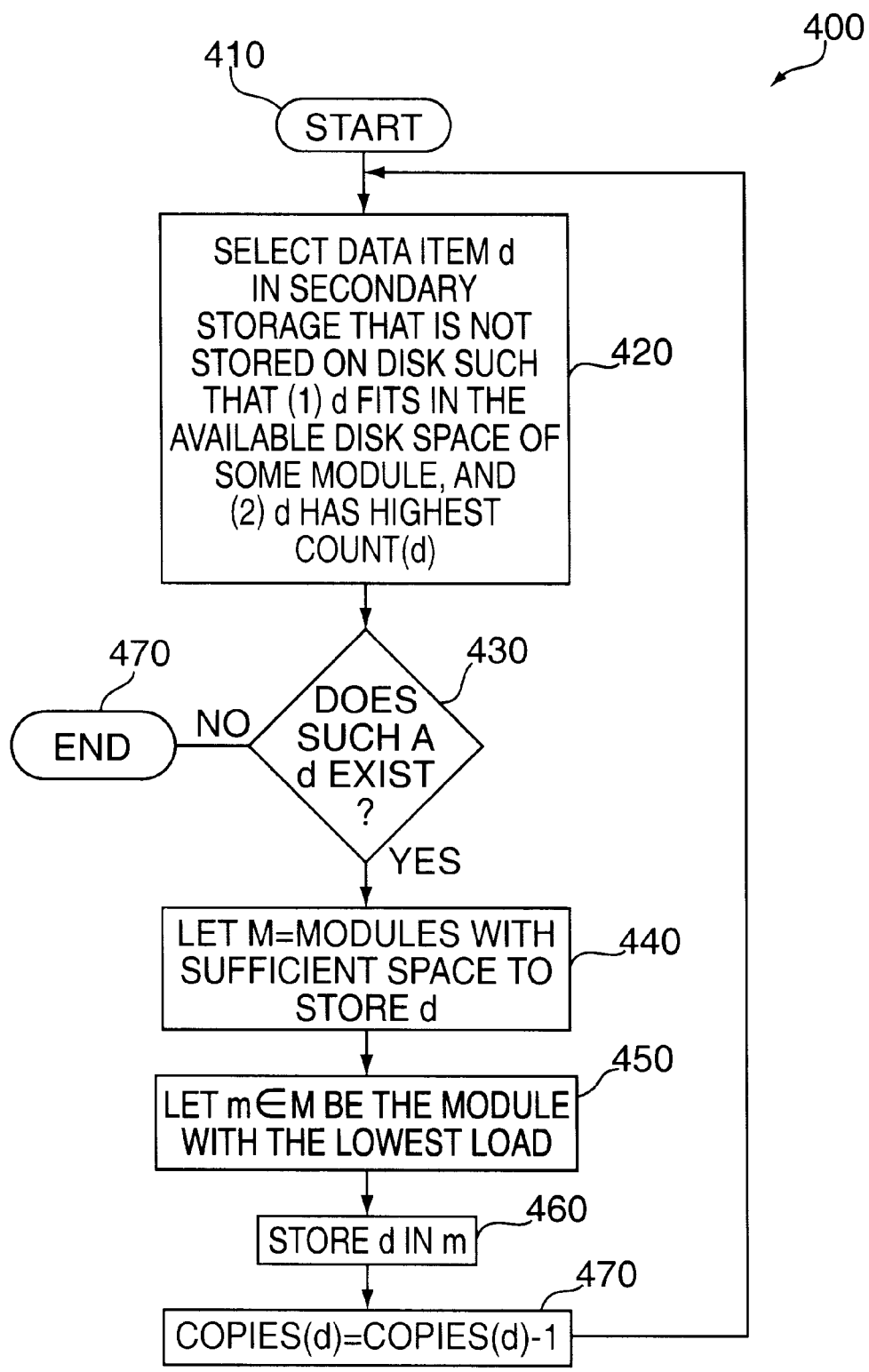
FIG. 4 depicts a flowchart specification of a more general version of the Data Initialization Protocol.

FIG. 4 depicts a flow diagram of the Data Initialization Protocol 400. At each iteration of the protocol 400, the data item with the highest replication count (denoted by copies (d)) is selected at step 420 and, as in the previous version of the protocol, this data item is stored at the module with sufficient free disk space having the lowest load as determined in steps 440, 450, and 460. After the data item is stored, the replication count copies(d) is decremented by 1, at step 470, and the next iteration begins at step 420.

When a user requests a data item that is not stored on the disk drives, the storage server retrieves the data from secondary storage, loads it onto a selected module disk drive cluster, and outputs the data for delivery to the requesting user(s). In order to determine at which disk drive cluster the data should be stored, a Data Retrieval Protocol is used. If there is no available disk space on any of the clusters, and there is at least one data item with more than a single copy on disk, the Data Retrieval Protocol will select one such data item and remove a copy from disk to make room for the new data item. The basic strategy of the Data Retrieval Protocol is to store the new data item on the least loaded module that has sufficient free disk space to accommodate the new data item. If no modules have available disk space, however, then the Data Retrieval Protocol will make room for the new data item by replacing one of the data items currently on the disk drives. Alternatively, if no free space is available, the system may send the data item to the user without storing the data item.

Selecting the data item on disk to be replaced is similar to the selection of virtual memory pages to be replaced in an operating system. The Data Retrieval Protocol borrows from two page replacement algorithms, called Least Recently Used and Not Frequently Used, which are well known in the operating system arts. Specifically, the Data Retrieval Protocol maintains a view count for each data item which indicates the number of times the data item has been requested, and a timestamp for each data item indicating the time at which the data was last requested. The protocol then identifies the set of data items which are both inactive and replicated, and from this set selects the item that has been least frequently requested (i.e., having the smallest view count), breaking ties by selecting the item that was least recently used (i.e., having the earliest timestamp). A data item is active, and thus ineligible for the aforementioned set of replacement candidates, in any one of the four following situations: (1) the data item is being read from the disk drives in response to a user access request, (2) the data item is being retrieved from secondary storage and stored on the disk drives, (3) the data item is being migrated to another module disk drive cluster, and (4) the data item is in the process of being replicated.

Figure 5:
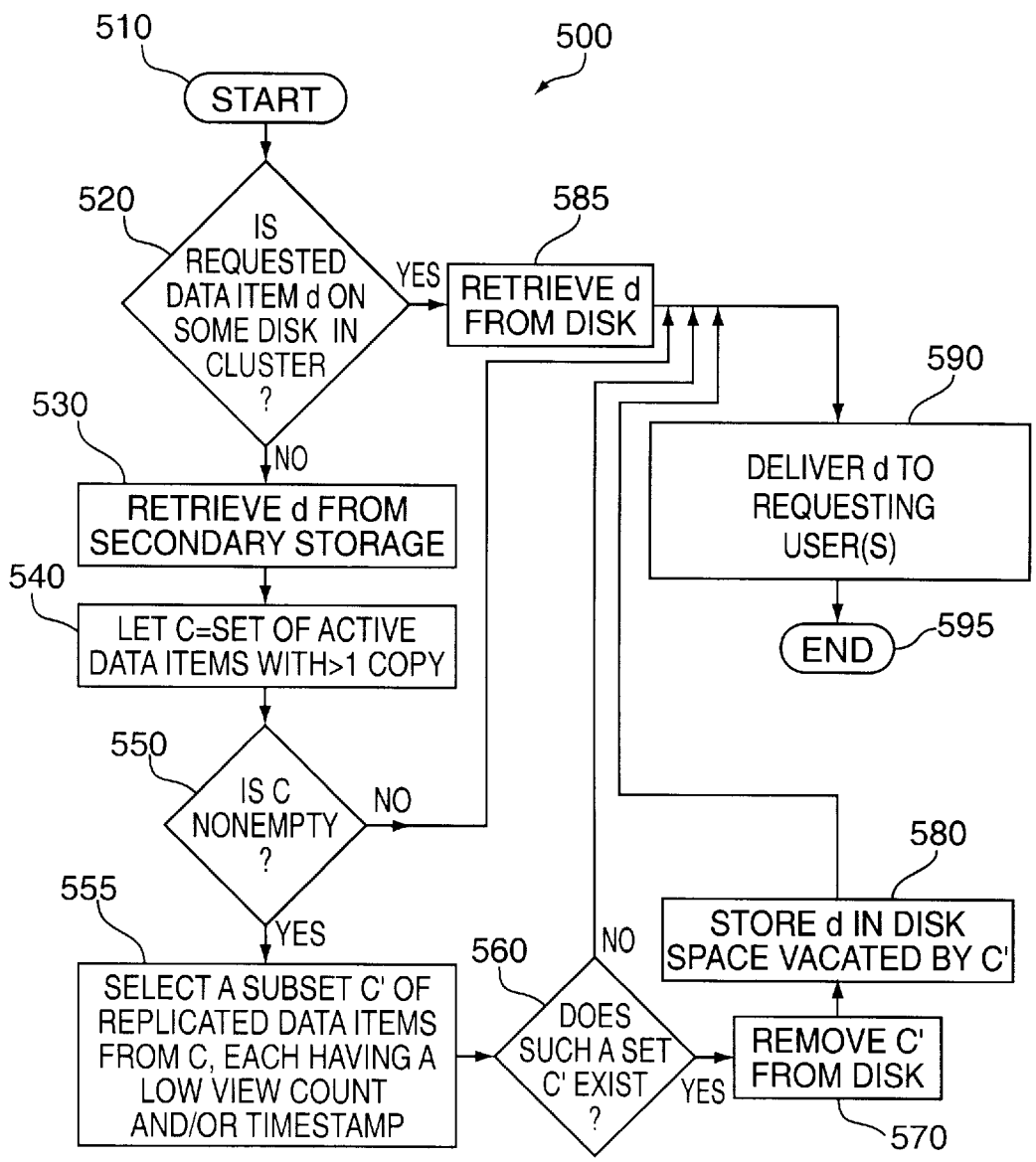
FIG. 5 depicts a flowchart specification of the Data Retrieval Protocol.

FIG. 5 depicts a flow diagram of a Data Retrieval Protocol 500. This Protocol begins at step 510 and then checks (at step 520) whether the requested data item d is stored on the disk drives, and if the data is stored on disk, the data item d is retrieved at step 585. If the data is not locally available, the protocol retrieves data item d from secondary storage at step 530, and then, at step 540, determines the set C of inactive data items having more than one copy. If set C is empty as determined by the query at step 550, data item d is output for delivery to the requesting user(s) at step 590. Otherwise, at step 555, the protocol tries to select a subset C' of set C of data items in the same module, each having a low view count and/or timestamp. If such a subset C' does not exist as determined at step 560, data item d is forwarded to the user without being stored on the disk drives at step 590. Otherwise, at step 570, the protocol removes set C' from the disk drives, stores data item d on disk in the vacated spot at step 580, and forwards d to the host controller at step 590. The protocol ends at step 595.

In addition to the protocols disclosed, the present invention employs dynamic data migration to maintain server performance as user access patterns change over time. A low-priority, non-real-time thread migrates data to new modules based on monitored access patterns, with the objective of evenly re-distributing popular data over all modules. A second low-priority non-real-time thread migrates data to new tracks on the same disk drives, also based on observed access patterns, with the objective of locating popular data on the faster outer tracks of disk drives. The difference in seek and transfer rates between the outer and inner tracks of a disk are substantial; for example, the internal transfer rate of a Seagate Cheetah disk varies from 152 Mbps on inner tracks to 231 Mbps on outer tracks, and the seek time can vary from 2 ms to 13 ms depending on how far away the next segment of data on the disk drive is. The movement of popular data by the second thread to faster tracks can therefore significantly increase disk bandwidth, and consequently, overall server performance.

Figure 6:
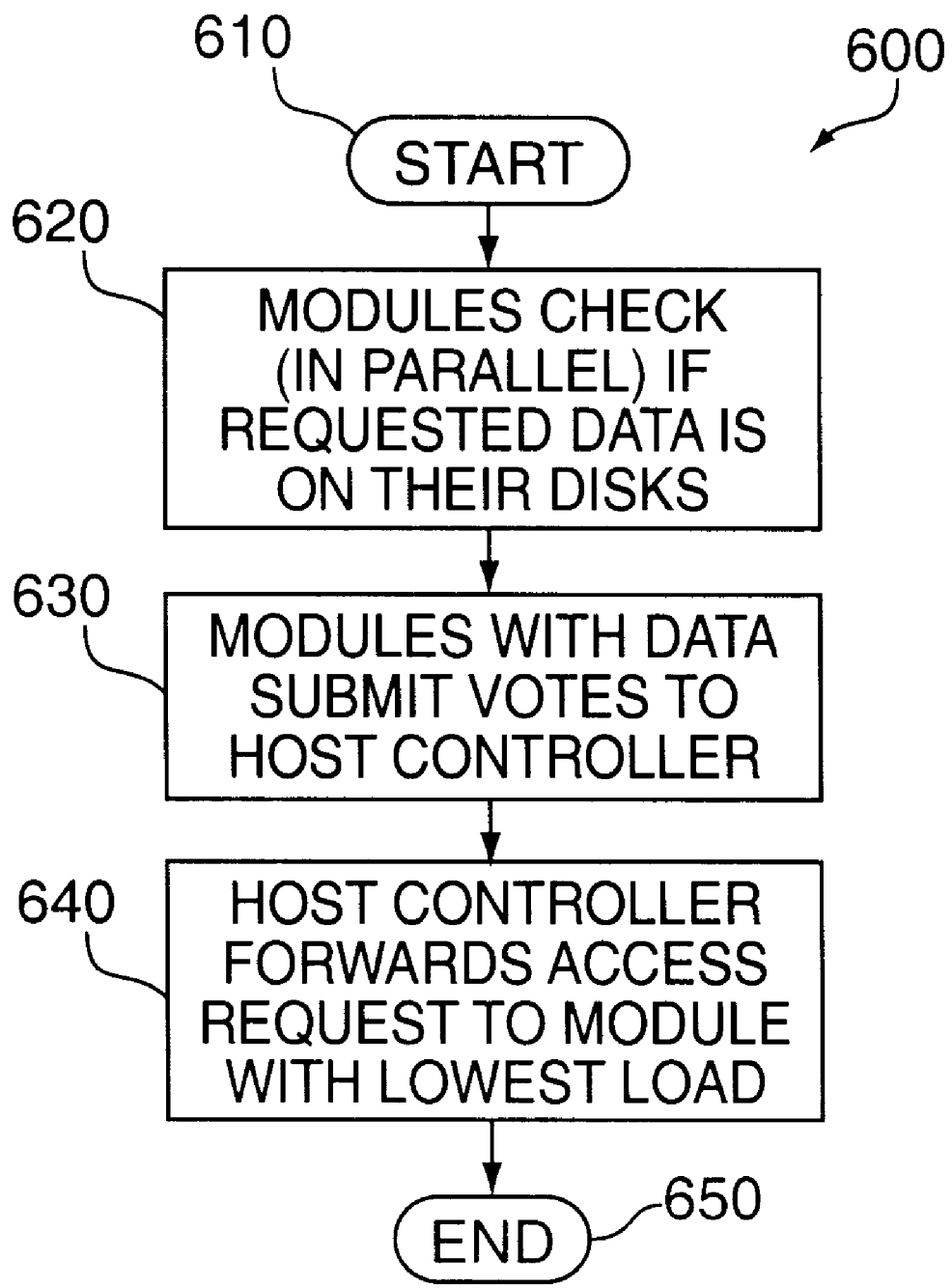
FIG. 6 depicts a flowchart specification of the Access Request Assignment Protocol.

In addition to data management, in a modular server architecture it is necessary to assign user access requests to modules, a task that is particularly important when the requested data item is located at multiple modules. This task is accomplished in the present invention by an Access Request Assignment Protocol that is performed by the host controller. The object of the protocol is to assign requests to modules such that outstanding user requests are evenly distributed among the module processors, thus resulting in steady-state module loads. The Access Request Assignment Protocol 600 is depicted as a flow diagram in FIG. 6. The protocol 600 is essentially a conventional voting algorithm (voting algorithms are well-known in the distributed system arts.) The process begins at step 610 and proceeds to step 620 wherein each of the module processors determines, in parallel, whether the requested data item is stored on its disk drive cluster. At step 630, all processors that have the requested data item submit a vote to the host controller and, at step 640, the host controller forwards the access request to the module with the lightest load. The protocol 600 ends at step 650.

After an access request has been forwarded to a module by the Access Request Assignment Protocol 600, the request waits in the module queue for disk drive servicing. Since module loads may become uneven over time, the present invention employs an Access Request Migration Protocol which attempts to dynamically re-balance module loads by moving requests waiting for service from one module's queue to another module's queue. Of course, the protocol can only migrate a request to another module if the requested data item is replicated (i.e., another complete copy of the data is located on some other module disk cluster.)

The basic strategy of the Access Request Migration Protocol is to find the two modules in the server with the maximum and minimum loads, and attempt to migrate a user request from the maximum-loaded module queue to the minimum-loaded module. The protocol repeats this process periodically, running as a background thread.

Figure 7:
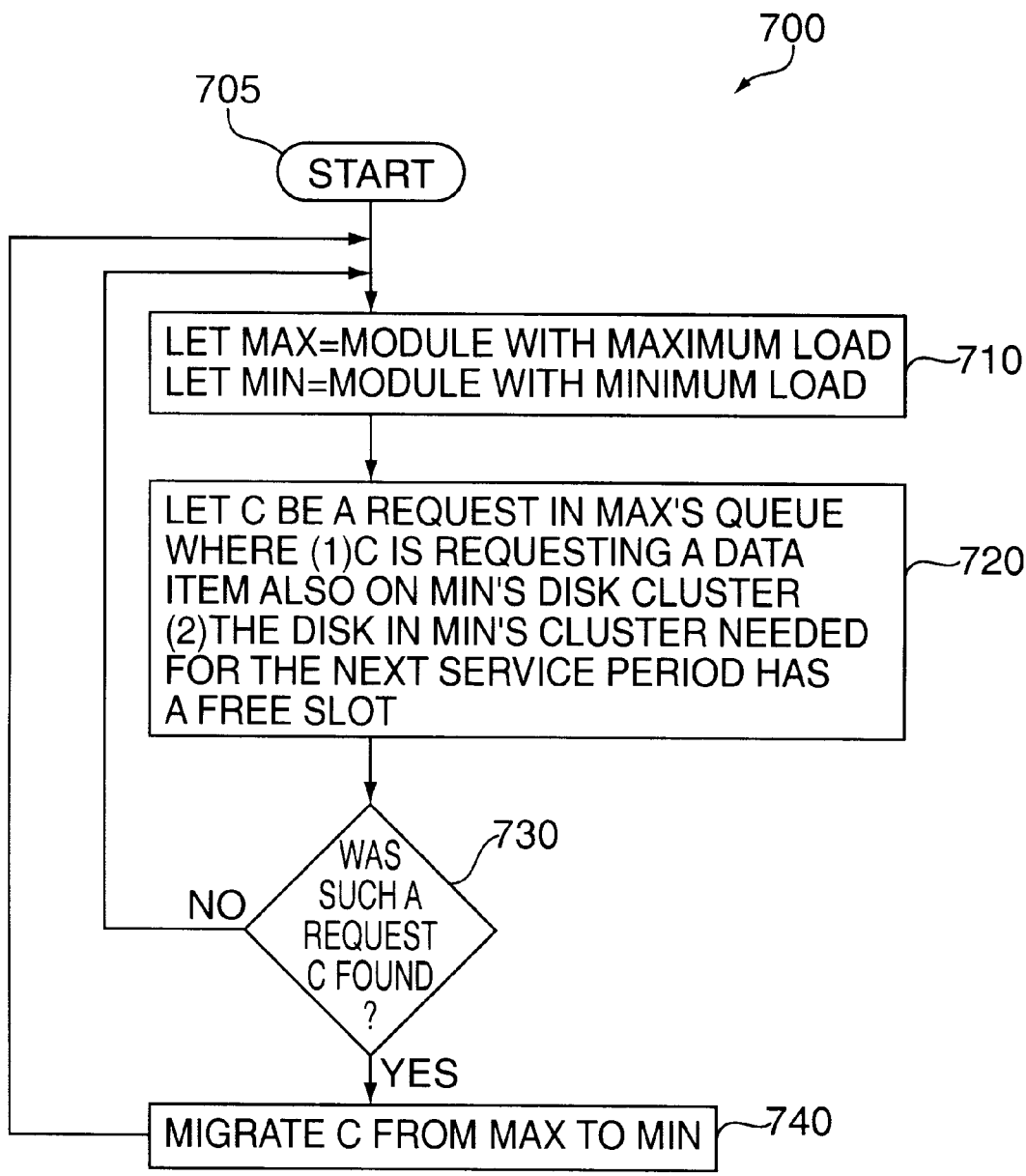
FIG. 7 depicts a flowchart specification of the Access Request Migration Protocol.

FIG. 7 depicts a flow diagram of the Access Request Migration Protocol 700. The protocol begins at step 705 and proceeds to step 710 wherein the protocol first finds MAX, the module with the largest load, and MIN, the module with the lightest load. The queue of outstanding requests in MAX's queue is then examined at step 720 to see if there is some request in the queue waiting to access a data item with another copy at MIN, such that the disk in MIN's cluster needed for the next service period has a free slot. If such a request is found, it is migrated at steps 730 and 740 from MAX to MIN). Optionally, in the case where multiple such requests are found, it is advantageous for the protocol to migrate the request for the largest data item (i.e., the data that will take longest to read from disk). This process is then repeated indefinitely, starting at step 710.

The foregoing discloses a detailed description of a modular architecture and data management methods for a general-purpose storage server. In video servers, there are a number of additional issues that arise due to the specific nature of video programs. In particular, it is advantageous to have the Data Initialization Protocol store only "leader tracks" containing the first few minutes of a movie on the disk drives, and then, once a movie has been requested for viewing, retrieve the remainder of the movie from secondary storage to the disk drives while the user is watching the leader track. This allows the video server to deliver a much larger volume of programs in real-time, rather than initially storing complete movies on the disk drives. As in the case of general-purpose data, leader tracks should be evenly distributed over the server modules, and when retrieving the remainder of a movie from secondary storage, it is not necessary to store the data at the same module at which the leader is located. Finally, in the Access Request Migration Protocol, if there are multiple outstanding request candidates in the maximum-loaded module, the optional selection procedure should choose the request for the movie with the longest remaining playing time and least recently manipulated, i.e., least recent use of fast forward, rewind and the like.

While this invention has been particularly shown and described with references to a preferred embodiment thereof, it will be understood by those skilled in the art that various changes in form and details may be made therein without departing from the spirit and scope of the invention as defined by the appended claims.

What is claimed is:

1. In a storage server comprising a plurality of modules, each of said modules comprising a processor and a plurality of disks and a host controller, a method comprising the steps of:

receiving data requests issued from a plurality of clients, sending vote solicitations from said host controller to each of said modules, each of said vote solicitations containing the name of the requested data, receiving votes from said modules that have said requested data on the module's respective disks, each of said votes containing a module ID, if one or more of said votes are received, selecting one of said votes according to a voting algorithm, forwarding said data request to the module that sent the selected vote, and after said module retrieves said requested data from the respective disks, receiving said data from said module and sending said data to said clients issuing said data request.

2. The method of claim 1 wherein if none of said votes are received, retrieving the requested data from secondary storage.

3. The method of claim 1, where said votes contain data in addition to said module ID.

4. The method of claim 3, where said additional data in said vote is a numeric value denoting the load of the module that sent said vote.

5. The method of claim 4, where said voting algorithm selects the vote having the lowest numeric value.

6. The method of claim 1, where said data stored in secondary storage and on said disks are video programs.

7. The method of claim 1, where said data is stored on disk using RAID.

8. The method of claim 1, where said requested data, when retrieved from secondary storage, is stored on disk in one of said modules.

9. The method of claim 8, where storing said data on disk is preceded by deleting data on said disks.

10. The method of claim 1, where user data requests waiting for service at one of said modules are migrated to another of said modules.

11. The method of claim 10, where said migration is based on the loads of said first and second modules.

12. The method of claim 1, where the degree of replication of a data item is based on the frequency with which said data item is requested.

13. The method of claim 12, where said degree of replication changes dynamically with time.

14. The method of claim 1, further comprising the step of migrating data residing on the disks of one of said modules to another of said modules.

15. The method of claim 14, wherein said data is migrated based on the frequency with which said data item is requested.

16. The method of claim 1, further comprising the step of migrating data residing on the disks of one of said modules to different tracks in said disks.

17. The method of claim 16, where said data is migrated based on the frequency with which said data item is requested.

18. The method of claim 6, where said data is stored on disk as a short leader track and a long video program.

* * * * *